US006449254B1

(12) United States Patent
Hadjiahmad

(10) Patent No.: US 6,449,254 B1
(45) Date of Patent: Sep. 10, 2002

(54) ATM CELL FILTERING

(75) Inventor: Massoud Hadjiahmad, Thornhill (CA)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/209,601

(22) Filed: Dec. 11, 1998

(51) Int. Cl.[7] .......................... H04L 12/28; G06F 15/16

(52) U.S. Cl. ....................... 370/235; 370/389; 370/395; 709/235; 709/240

(58) Field of Search ................................ 370/229, 230, 370/231, 232, 233, 234, 235, 239, 330, 389, 392, 428, 395; 711/100, 101; 709/229, 230, 233, 235, 240

(56) References Cited

U.S. PATENT DOCUMENTS 5,699,346 A * 12/1997 VanDervort et al. ........ 370/233
5,745,488 A * 4/1998 Thompson et al. ......... 370/395
5,761,191 A * 6/1998 VanDervort et al. ........ 370/232
5,764,626 A * 6/1998 VanDervort et al. ........ 370/232
6,041,043 A * 3/2000 Denton et al. .............. 370/395

* cited by examiner

*Primary Examiner*—Alpus H. Hsu
*Assistant Examiner*—Afsar M. Qureshi
(74) *Attorney, Agent, or Firm*—Samuels, Gauthier & Stevens, LLP

(57) ABSTRACT

A data communication network operating in asynchronous transfer mode has a data transmission node and a data reception node. The nodes transfer data cells having associated headers followed by associated payloads. Each header indicates whether or not the associated cell is unassigned, is idle, or has an erroneous header. A filter of the data reception node stores each header of the sequentially received cells in a header memory. The filter stores, in a cell memory, cells that are non-idle, are assigned, and have non-erroneous headers. The filter rejects from storage payloads associated with idle, unassigned, and erroneous cells.

25 Claims, 6 Drawing Sheets

Format of Erroneous Header 20a

| XXXX | XXXXXXXX | XXXXXXXXXXXXXXXX | XXX | X | Erroneous HEC | 22a |
|---|---|---|---|---|---|---|

Format of Idle Header 20b

| 0000 | 00000000 | 0000000000000000 | 000 | 1 | | 22b |
|---|---|---|---|---|---|---|

Format of Unassigned Header 20c

| 0000 | 00000000 | 0000000000000000 | XXX | 0 | | 22c |
|---|---|---|---|---|---|---|

FIG. 2C

ATM CELL FILTERING

BACKGROUND OF THE INVENTION

The invention relates to transferring data along a network, and, in particular to filtering idle, unassigned, and erroneous data cells from a data stream in a network operating in asynchronous transfer mode (ATM).

ATM Networks transfer digital information, such as voice, video, and other data (hereinafter referred to collectively as data), between nodes of the network in a bit stream formed of sequentially received data cells. Each of the cells includes a header and a payload. The header contains information about each cell, and the payload contains the data that the ATM Network transfers.

ATM Networks operate according to specific standards. For example, the Telecommunication Standardization Sector for the International Telecommunication Union (the ITU) has developed standards and recommendations for the operation of ATM networks. The ITU-T standards define cells having fifty-three bytes, i.e., 424 bits divides into fifty-three eight-bit sections. The first five bytes form the header of the cell; the subsequent forty-eight bytes form the payload of the cell. The header provides the node of the network, which receives the associated cell (i.e., the receiving node), with information about the cell.

For example, in some cases, the header indicates that the roll of the associated cell is to maintain the line transmission rate between the nodes of the ATM network. The node of the network, which is transmitting the associated cell (i.e., the transmitting node), may not have data to transmit to the receiving node. However, based on the ITU-T standard, the receiving node expects to receive cells in the bit stream at a predetermined line transmission rate. Therefore, when no data is available for transmission, the transmitting node will formulate a "blank" cell (i.e., an unassigned cell or an idle cell). The transmitting node designates that the cell is unassigned or idle in the cell header, and transmits the cell in the bit stream to the receiving node to maintain the predetermined line transmission rate.

In other cases, the cell header will indicate that the cell may have been corrupted. Every cell header contains a Header Error Control (HEC) code that is a checksum indicating if the header of the received cell contains an error. The transmitting node formulates the HEC code based on the first four bytes of the cell header and transmits the HEC code in the fifth/last byte of the header. To save time, the HEC code is a checksum of the header only and is not a checksum of the entire fifty-three byte cell. When the cell has an erroneous header, the receiving node discards cell. For example, an HEC code that indicates an error in the cell header may result in a cell delivered through the wrong channel.

ATM Networks store each received cell and examine the associated headers to determine if the cells are idle, are unassigned, or have erroneous headers. Idle cells, unassigned cells, and cells with erroneous headers are discarded by the receiving node of the ATM network because they do not contain wanted data.

SUMMARY OF THE INVENTION

One aspect of the invention is a method for filtering unwanted data cells transmitted along a network by examining a fractional portion of each data cell to make a determination of whether each data cell is a wanted data cell or an unwanted data cell. Based on the determination, the data cells are selectively stored: the entire portion of each corresponding wanted cell is stored, and the remaining unstored portion of each corresponding unwanted cell is rejected from storage.

Preferred embodiments of this aspect of the invention include the following features.

A data communication network, which operates in asynchronous transfer mode, has a data transmitting node and a data receiving node. The nodes transfer data cells having associated headers followed by associated payloads. Each associated header indicates whether or not the data cell received by the data receiving node is unassigned, is idle, or has an erroneous header.

The data receiving node includes a network device, typically consisting of a hardware filter, such as a pattern matching filter in which the pattern is defined in the network software such as a device driver. The filter controls the storage of each header of the sequentially received cells in a header memory. The device stores cells that are non-idle, are assigned, and have non-erroneous headers in a different cell memory. The network device rejects from storage any payloads associated with idle, unassigned, and erroneous cells.

To store received cells or reject payloads from storage, the network device examines the header of each associated received cell to determine if the received cell is an idle cell, is an unassigned cell, or has an erroneous header. The network device rejects cells from storage by setting a pointer to a location of a subsequent received cell in the stream of the sequentially received cells. The pointer indicates the location of the associated header of the subsequent received cell.

The receiving node stores the header of each associated received cell based on a system clock established by the receiving node independently of the data reception clock. The system clock has a higher frequency than the data reception clock.

Among other advantages, each embodiment within the scope of the claims may have one or more of the following advantages. The method and network device each allows efficient processing of received cells because the payloads of unassigned, idle, and erroneous cells are not stored. The method and network device each allows the receiving node to store only the payloads of cells containing wanted data without expending additional processing time to store the payloads of cells containing unwanted data.

In addition, cells of each received cell having wanted data can be processed according to a system clock. The system clock can operate at a faster frequency than a data reception clock that is used to store received cells, e.g., in a buffer at a predetermined line transmission rate between the transmitting and receiving nodes. Also, because only a single five byte header is initially stored rather than the entire 53 byte received cell, the memory used to filter out unwanted data cells can be allocated efficiently, for example, the memory dedicated to processing incoming cells can be minimized.

BRIEF DESCRIPTION OF THE DRAWINGS

FIG. 2*c* is a schematic diagram of an erroneous header, an idle header, and an unassigned header, wherein each header is incorporated into standard ATM data cells of FIG. 1 to signify that the data cells contain unwanted data;

DETAILED DESCRIPTION

Figure 1:
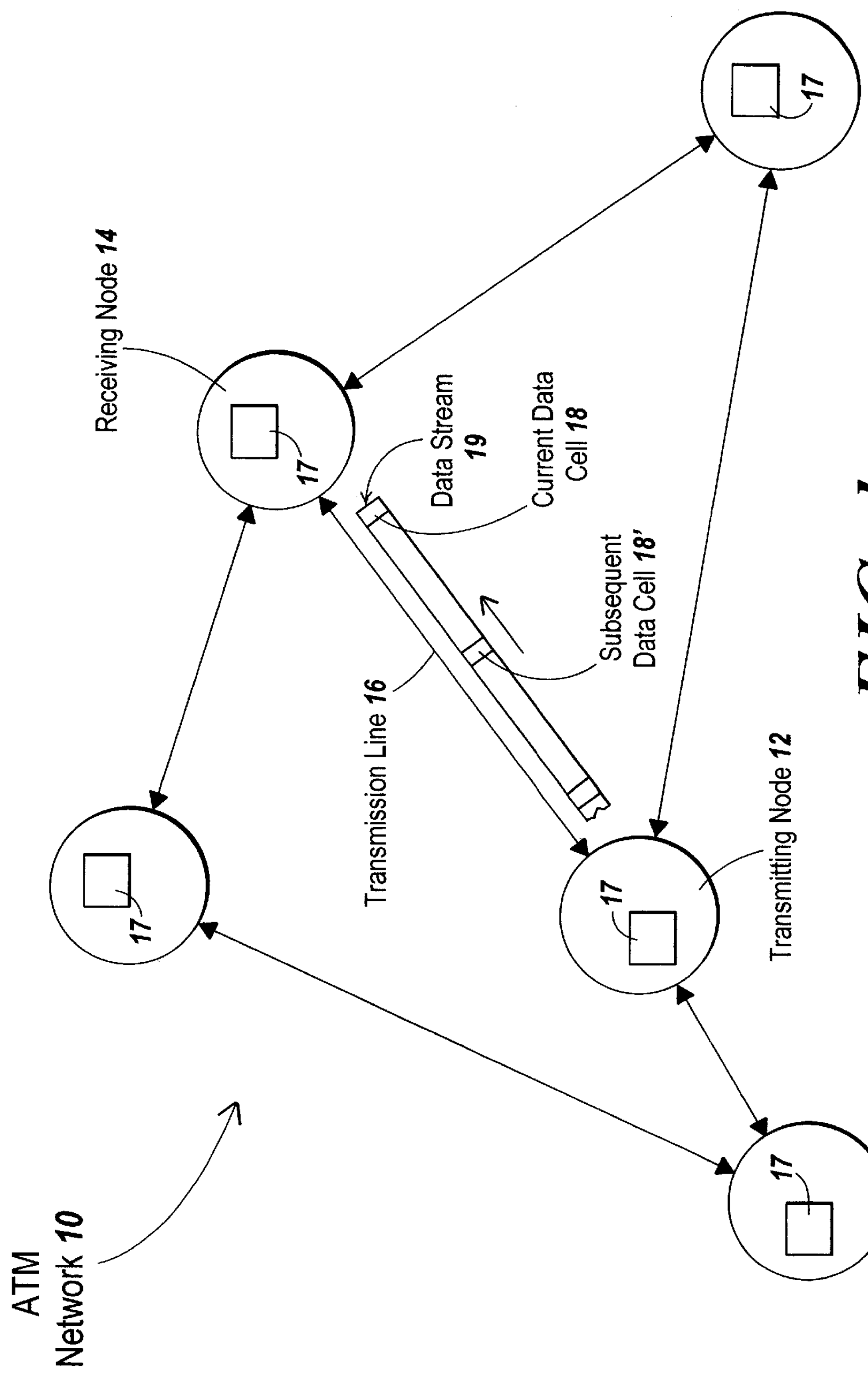
FIG. 1 is a schematic representation of an ATM network system.

Referring to FIG. 1, a network system 10 operating in asynchronous transfer mode (ATM) transfers digital data between nodes of the network, for example data transmitting node 12 and data receiving node 14. The data travels between the nodes along a transmission line 16, for example, an asynchronous digital subscriber line. Typically, the ATM network transfers data between several nodes as the data travels from the source to the destination. Thus, data receiving nodes 14 also may become data transmitting nodes 12 after the data is received. In addition, each node of ATM Network 10 can transmit or receive data, and, thus, the exchange of data is bi-directional.

Each node of ATM network 10 contains electronic hardware as well as software instructions contained on a computer readable medium 17 that, in part, govern the operation of the ATM network. For example, the software of computer readable medium 17 provides a device driver to, in part, control the operation of the network hardware. The network hardware filters unwanted data, which is formatted as standard data cells 18, from a continuous data stream 19 extending from the transmitting node 12 to the receiving node 14.

Transmitting node 12 transfers the data to receiving node 14 at a predetermined frequency, for example, 155.52 Megabits/second (Mbps). Data stream 19 is a continuous series of serially transmitted bits that contains the data, which is formatted into standard ATM data cells 18. Transmitting node 12 transmits the data cells sequentially. Thus receiving node 14 first receives current data cell 18, which is the data cell 18 currently being received by receiving node 12, and, then, receives subsequent data cell 18', which is the next data cell in the sequence of cells.

Figure 2A:
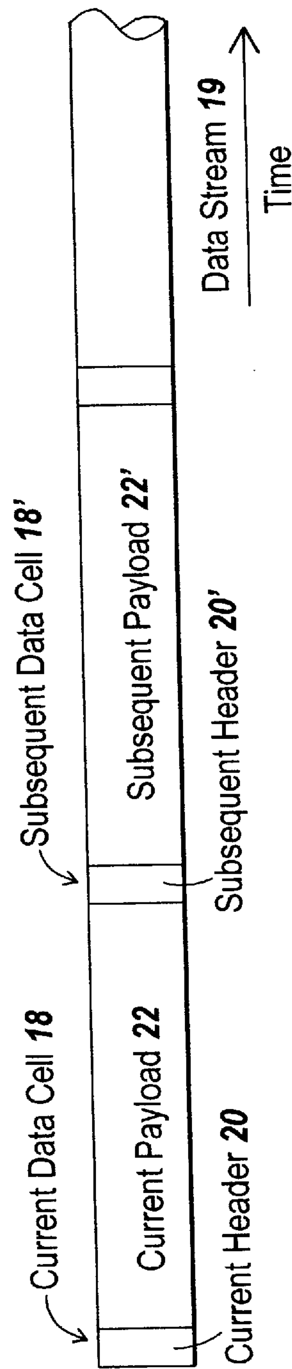
FIG. 2*a* is a schematic diagram of a data stream of FIG. 1 containing individual standard ATM data cells.

Referring to FIG. 2*a*, each ATM data cell 18 has a standard format that is defined by the ITU-T standards discussed above: fifty-three bytes of data are divided into a five byte header 20 and a forty-eight byte payload 22. Header 20 includes information about the type of payload 22 (e.g., OAM, user, and physical layer payloads) and about the method of transmission of cell 18. A set of standard data cells 18 are transmitted sequentially to form current data cell 18 and subsequent data cell 18' having a subsequent header 20' and a subsequent payload 22'.

Figure 2B:
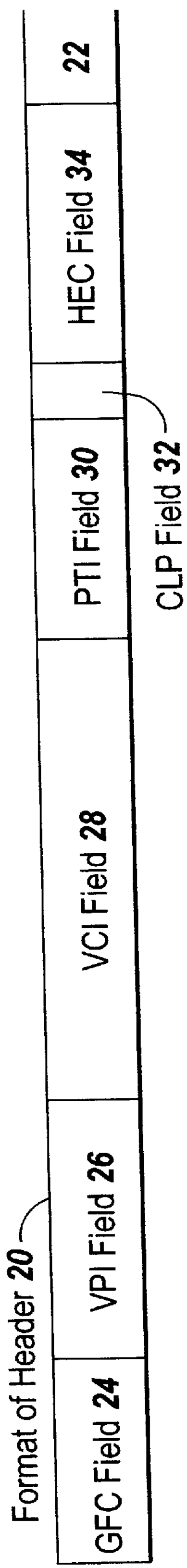
FIG. 2*b* is a schematic diagram of the format of a header of the standard data cells of FIG. 1.

Referring to FIG. 2*b*, one data cell 18 is shown having a header 20 and a payload 22. Each header 20 has six separate fields. Each of the fields contains a predefined number of bits that the physical layer of ATM network 10 recognizes and processes. The fields of the header include a Generic Flow Control (GFC) field 24, the Virtual Path Identifier (VPI) field 26, the Virtual Channel Identifier (VCI) field 28, the Payload Type Identifier (PTI) field 30, the Cell Loss Priority (CLP) field 32, and the Header Error Control (HEC) field 34.

GFC field 24 occupies the first four bits of each header 20 (bits 0–3). GFC field 24 provides information that ATM network 10 uses to multiplex transmitted data. GFC field 24 is present only between a host computer and the network, and the first switch of ATM network 10 overwrites the GFC field.

VPI field 26 and the VCI field 28 each occupy bits 4–11 and bits 12–27 of each header 20 respectively. Each of the fields 26, 28 respectively define the virtual path and the virtual channel that will deliver each data cell 18 to receiving node 14 of ATM network 10.

PTI field 30 occupies bits 28–30 of each header 20. PTI field 30 describes the type of payload 22 each cell 18 contains, for example, user data such as voice or video data or layer management information such as call set-up information. PTI field 30 also indicates whether the data cell 18 experienced congestion.

CLP field 32 is a single bit (bit 31) that indicates the loss priority of an individual data cell 18. If CLP field 32 has a value of logical "0", the cell contents have a high priority. High priority data cells 18 are less likely to be discarded by ATM network 10 than low priority cells when ATM network 10 experiences congestion at a given node. A node of the ATM network 10 discards data cells 18 having a high priority only after the node discards all low priority data cells 18 present at the node.

HEC field 34 occupies bits 32–39 of header 20 and identifies data cells 18 having erroneous headers 20*a*. HEC field 34 includes eight bits that form a checksum. For example, the checksum is a cyclic redundancy code that is the remainder of value obtained by dividing the first 32 bits of header 20, i.e., the first four bytes of header 20, by the polynomial $x^8+x^2+x+1$ with the binary value "01010101" added to the remainder. HEC field 34 primarily guards against single bit errors and, to a lesser extent, multi-bit errors.

Referring to FIG. 2*c*, some of the data in data stream 19 may be unwanted, and standard data cells 18 (FIG. 2*a*) containing unwanted data are filtered from data stream 19. For example, in an ATM Network such as network 10, receiving node 14 must discard three types of unwanted data cells from data stream 19: data cells 18*a* having erroneous headers 20*a*, idle data cells 18*b*, and unassigned data cells 18*c*. If receiving node 14 determines that current header 20 is an erroneous header 20*a*, i.e., that the checksum of HEC field 34 does not match the first four bytes of header 20, receiving node 14 discards the associated data cell 18*a* because the associated cell may be corrupted. To save time, ATM network 10 does not verify the data in associated payload 22*a*. Rather, as discussed above, receiving node 14 is designed with the assumption that the error in header 20*a* indicates that associated cell 18*a* may have been corrupted.

Receiving node 14 also discards idle and unassigned data cells 18*b*, 18*c*Essentially, data cells 18*b*, 18*c* act as spacers to fill the data stream 19 when transmitting node 12 does not have enough data to transmit continuously. Though ATM network 10 transfers wanted data asynchronously (i.e., at different rates between transmitting and receiving nodes 12 and 14), ATM network 10 transfers the data stream 19 in a generally synchronous manner. In other words, the transmitting node 12 transfers data cells 18 at regular intervals that are defined by the predetermined frequency, and the receiving node 14 expects to receive one data cell 18 at each of the regular intervals.

To maintain the synchronization between network nodes 12 and 14, transmitting node 12 always transmits a continuous data stream 19 in the form of full data cells 18 at the predetermined frequency. Therefore, if transmitting node 12 experiences congestion, i.e., has more data than can be sent at the predetermined frequency, transmitting node 12 discards some of the data. On the other hand, if transmitting node 12 has too little data to send, transmitting node 12 inserts idle or unassigned data cells 18 into the data stream 19 to ensure that receiving node 14 receives data cells 18 continuously at the predetermined frequency.

Idle data cells 18*b* and unassigned data cells 18*c* serve essentially the same function. ATM network 10 uses both types of cells 18*b*, 18*c* to compensate for cell rate decoupling between nodes 12, 14 of network 10. Idle data cells 18*b* are physical layer cells while unassigned data cells 18*c* are ATM layer cells. Different technical standards govern the two types of data cells 18*b*, 18*c* because the data cells are processed differently. The ITU-T Recommendation I.361 governs the processing of idle cells 18*b* while, on the other hand, the ATM Forum User Network Interface (UNI) standard 3.1 governs the processing of unassigned cells 18*c*.

Regardless of the applicable standard, once receiving node 14 identifies the type of cell 18*b*, 18*c* as idle or unassigned, both types of cells 18*b*, 18*c* are discarded in the same manner. CLP field 32 distinguishes idle data cells 18*b* from unassigned cells 18*c*. For example, CLP field 32 has a value of logical "1" for idle cells 18*b* while CLP field 32 has a value of logical "0" for unassigned cells 18*c*. Thus, idle data cell 18*b* has a low cell loss priority while unassigned data cell 18*c* has a high cell loss priority. The remainder of both idle header 20*c* and unassigned header 20*c* will typically be identical. However, unassigned header 20*c* can contain any binary value from 000 to 111 in PTI field 30.

Figure 3:
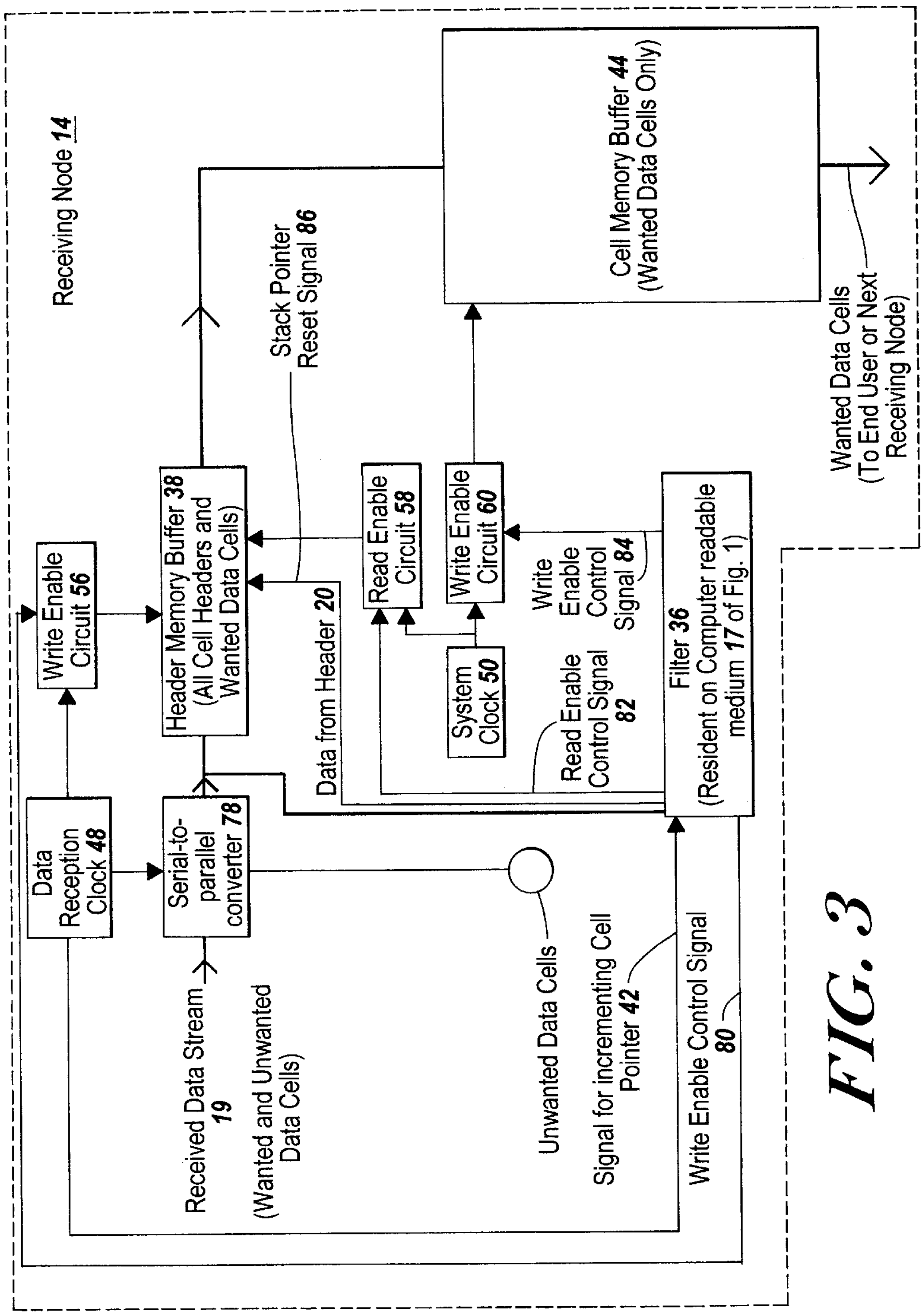
FIG. 3 is schematic diagram of a receiving node of the ATM Network of FIG. 1 that filters unwanted data cells from the data stream.

Referring also to FIG. 3, ATM network 10 identifies unwanted data cells, e.g., erroneous, idle and unassigned cells 18*a* –18*c*, and filters the unwanted cells from data stream 19. ATM network 10 discards unwanted cells without storing the associated unwanted payloads, e.g., payloads 22*a*–22*c*, in memory. Thus, ATM network 10 further processes only wanted data cells 18, for example, assigned and non-idle cells having error free headers 20. (An assigned cell is a cell that is not unassigned according to UNI standards, and a non-idle cell is a cell that is not idle according to ITU-T standards.)

To filter unwanted data cells 18*a*–18*c*, receiving node includes a serial-to-parallel converter 78, two memory buffers 38, 44, and a hardware filter 36 that is a pattern matching filter implemented as a data register. A pattern of hardware filter 36 is established by, e.g., a device driver or other software implemented as a set of software instructions on computer readable medium 17 (FIG. 1). Serial-to-parallel converter 78 of receiving node 14 transfers the serial bits of the data stream into a parallel byte (i.e., eight bits) of data. Receiving node 14 filters unwanted data cells from the data stream 19 by transferring each byte of data to filter 36. In addition, each cell header 20 is written to the header memory buffer 38 to ensure that no wanted data is discarded prior to determining whether the data should be discarded.

Filter 36 examines each stored header 20 on a byte by byte basis to determine whether the associated data cell 18 is a wanted data cell or an unwanted data cell. If data cell 18 is a wanted data cell, the remainder of data cell 18 is written to the header memory buffer 38 and the wanted data cell is transferred to cell memory buffer 44. To examine each stored header, filter 36 compares the appropriate bits of current header 20 to determine if cell 18 is idle or unassigned, and filter 36 uses the polynomial $X^8+X^2+x+1$, which is implemented as a hardware circuit, to determine if header 20 is erroneous.

If data cell 18 is an unwanted data cell, receiving node 14 discards the remainder of unwanted data cell 18 essentially by ignoring the remainder of the unwanted cell as it arrives at receiving node 14. Filter 36 disables a write enable circuit 56 with a write enable control signal 70 and the remainder of the current data cell 18, typically the entire current payload 22, cannot be written into header buffer memory 38. (In some cases, a portion of current payload 22, e.g., the first several bytes of the payload, could be written to header buffer memory 38 if filter 36 is slow in examining current header 20.) To discard the current payload 22, filter 36 tracks each byte that is received at serial-to-parallel converter 78 and increments a cell pointer 42. Cell pointer 42 is incremented by a signal from the data reception clock that indicates the reception of a bit of data. Thus, to indicate a byte is received, cell pointer 42 is incremented every eight clock cycles. When the entire current cell 18 arrives at node 14, filter 36 resets cell pointer 42 and begins processing subsequent data cell 18'. At that point, receiving node 14 overwrites current header 20 in header memory buffer 38 with subsequent header 20' from data stream 19.

Two clocks, in conjunction with filter 36, control the transfer of data to the memory buffers 38, 44. A data reception clock 48 is synchronized to the line transmission rate and controls, with filter 36, a write enable circuit 56 to allow receiving node 14 to write incoming data to header memory buffer 38. Write enable circuit 56 issues an write enable signal to header memory buffer 38 for each byte of all headers 20 (wanted and unwanted) and for each byte of wanted payloads 22. However, when an unwanted data cell is detected, write enable circuit 56 issues a write disable signal to header memory buffer 38, and no data is written to the memory buffer.

A system clock 50 controls, in part, a write enable circuit 60 and a read enable circuit 58 to allow receiving node 14 to transfer wanted data cells from header memory buffer 38 to cell buffer memory 44. System clock 50 may be faster than the data reception clock 48, e.g., 620 Mbps, because the system clock does not synchronize the transfer of data with an outside node, such as transmitting node 14, at the predetermined data transfer rate, which generally is a relatively slower rate to ensure data is not corrupted along transmission lines, e.g., line 16 of FIG. 1.

The operation of read and write enable circuits 58, 60 is similar to the operation of write enable circuit 56. After filter 36 determines that current header 20 indicates current data cell 18 is a wanted data cell, the filter transfers each byte of wanted data from header memory buffer 38 to cell memory buffer 44. To transfer the data between buffers, write enable circuit 60 issues a write enable signal to cell memory buffer 44 based on a write enable control signal 74 from filter 36, and read enable circuit 58 issues a read enable signal to header buffer memory 38 based on a read enable control signal from filter 36. Thus, filter 36 transfers each byte of current data cell 18, including both header 20 and payload 22, between memory buffers 38, 44.

If current data cells 18 contains unwanted data, both read enable circuit 58 and write enable circuit 60 issue disabling signals to the respective memory buffers 38, 44. The current header 20, which indicates current cell 18 contains unwanted data, is not transferred, and filter 36 ultimately writes over current header 20 with subsequent headers. Thus, in operation, receiving node 14 stores only payloads 22 of wanted data cells 18. In addition, receiving node 14 uses system clock 50 to quickly move header 20 from header memory buffer 38. (Alternatively, filter 36 could store payloads 22 of wanted data cells 18 directly into cell memory buffer 44 without first storing such cells into header memory buffer 38, or a single memory buffer could be used.)

Figure 4:
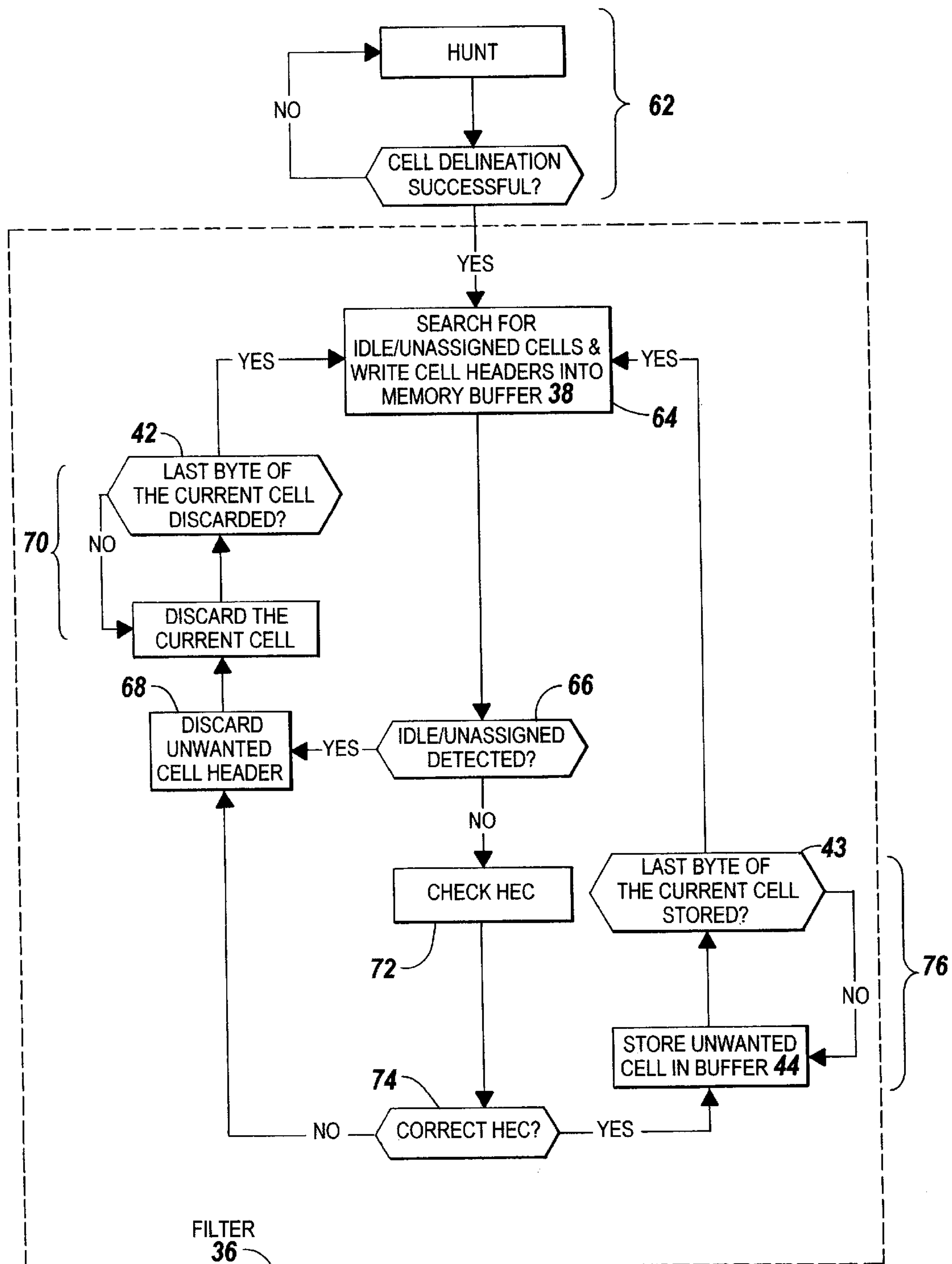
FIG. 4 is a diagram of an algorithm used by a filter of the receiving node of FIG. 3 for filtering unwanted data cells from the data stream of FIG. 1.
Figure 5:
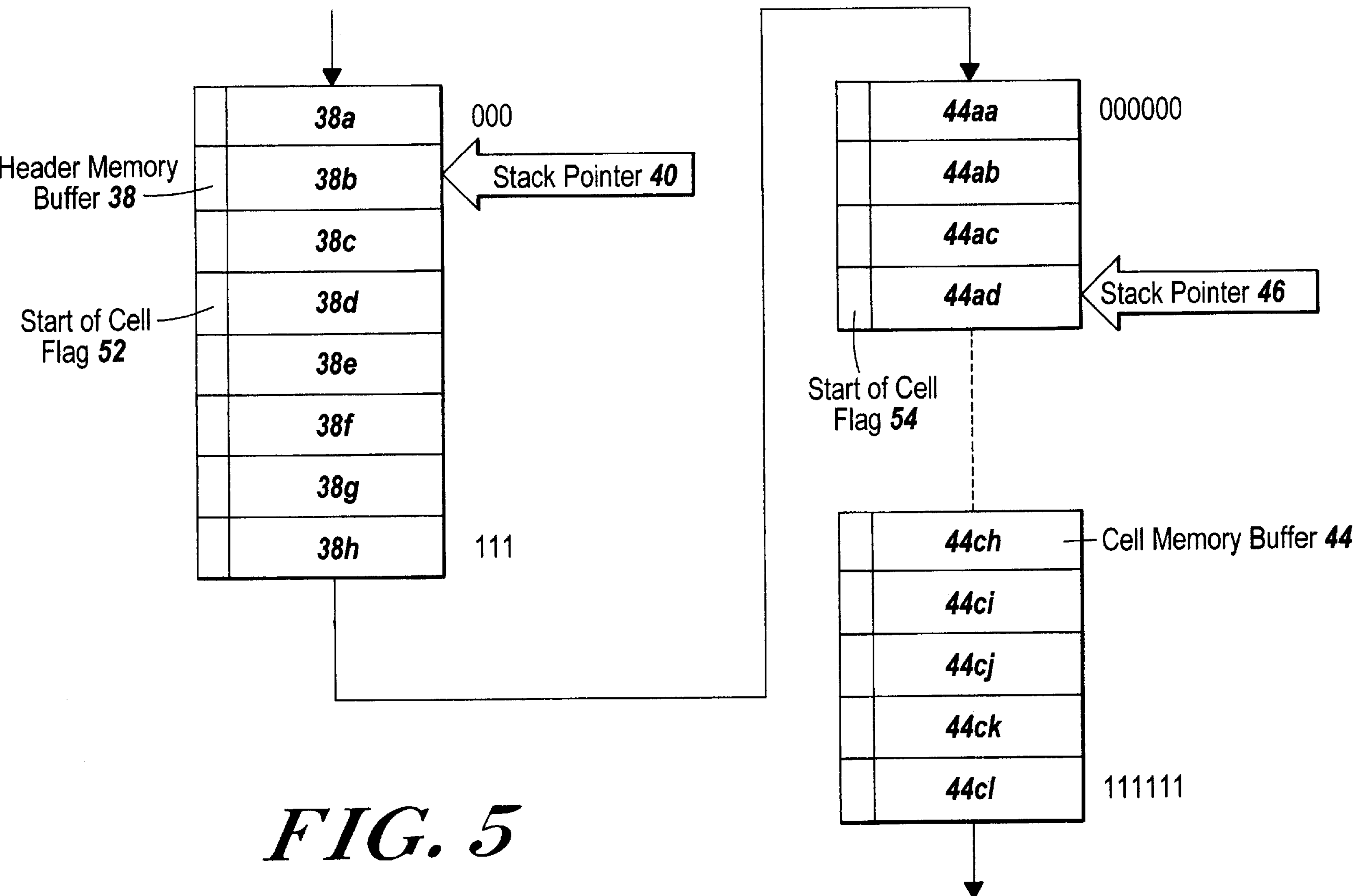
FIG. 5 is a schematic diagram of memory buffers of the receiving node of FIG. 3 used to store data cells according to the algorithm depicted in FIG. 4.

Referring to FIGS. 4 and 5, hardware filter 36 that is a pattern matching register that resides in the physical layer of receiving node 14. The ITU-T standard ITU-I.432 governs the removal of unwanted data cells, e.g., erroneous, idle, and unassigned data cells 18*a*, 18*b*, and 18*c* in ATM networks. ATM network 10 conforms to the ITU-T standard by filtering erroneous, idle and unassigned data cells 18*a*, 18*b*, and 18*c*, but ATM network 10 does not store associated payloads 22*a*, 22*b*, and 22*c* of such unwanted cells. Filter 36 controls the storage of wanted data cells in the memory buffers 38, 44 and the rejection of unwanted data cells from storage according to the algorithm of FIG. 4.

Initially, receiving node 14 synchronizes the reception of data cells 18 by determining the boundaries of the cells in the data stream 19 (step 62). Receiving node 14 uses the standard method of cell delineation defined by the ITU-T. Receiving node 14 enters hunt mode to locate a potential cell header 20 by looking for HEC fields 34 that match the potential headers 20. If receiving node 14 locates a potential cell header 20, node 14 enters presynch-mode which shifts 424 bits to the next potential header and compares the HEC code. If the potential HEC code corresponds to the previous four bytes, receiving node 14 begins to check a sufficient number of cells to increase the certainty that the bit stream is synchronized. If node 14 finds at least "δ" consecutive headers in the expected positions (wherein "δ" is a predetermined value), node 14 determines that cells 18 have been properly delineated and enters synch-mode to process the received cells in the data stream 19.

When cell delineation is successful, filter 36 stores the header of each one of the sequentially received cells in header memory buffer 38 (step 64). Header memory buffer 38 is a first-in-first-out (FIFO) stack which acts as a storage buffer. Header memory buffer 38 is sized to include nine bits by eight bytes of data. Each memory location 38*a*–38*h* of header memory buffer 38 is sized to 9 bits to contain a start of cell flag 52 (one bit) and one byte of each cell 18 (eight bits). Filter 36 sets the start of cell flag 52 to a logical "1" to indicate the starting location of current header 20 in the memory buffer. Otherwise, filter 36 sets each start of cell flag 52 to a logical "0".

Header memory buffer 38 contains eight memory locations 38*a*–38*h* to store one full header 20, i.e., five bytes of data, and to correspond to a binary stack pointer 40. Stack pointer 40 requires at least three bits to encompass all five bytes of header 20; two bits allow pointer 40 to locate only four addresses in header memory buffer 38 while three bits allow pointer 40 to locate eight addresses in header memory buffer 38. Allocating eight bytes of memory to header memory buffer 38 provides a simple implementation because stack pointer 40 has a one-to-one correspondence with the addresses of header memory buffer 38 and stack pointer 40 cannot erroneously point to an address outside header memory buffer 38. In addition, when incremented, stack pointer 40 automatically resets from the eighth location ("111") to the first location ("000"). Alternatively, stack pointer 40 could be reset to "000" after each header 20 is received based on a signal received from filter 36.

After filter 36 stores header 20 in header memory buffer 38, filter 36 examines header 20 to determine if the associated received cell 18 is either an idle cell 18*b* or an unassigned cell 18*c*. As discussed above, the structure of headers 20*b*, 20*c* is similar for both idle cells 18*b* and unassigned cells 18*c*. Therefore, filter 36 checks for both idle and unassigned cells 18*b*, 18*c* at the same location of filter 36 to improve efficiency.

If filter 36 determines that header 20 indicates that cell 18 is either an idle cell 18*b* or an unassigned cell 18*c* (step 66), filter 36 flushes header memory buffer 38 (step 68) and discards the current cell 18 in the data stream 19 (step 70). Filter 36 flushes header memory buffer 38 by incrementing stack pointer 40. For example, if header occupies the third through seventh bytes of header memory buffer 38 (corresponding to stack pointer 40 having binary values of "010" –"110"), filter 36 increments pointer 40 by one to a binary value of "111". Thus, the subsequent header 20' will occupy the eighth, first, second, third, and fourth locations of header memory buffer 38 and will overwrite a portion of current header 20. Alternatively, filter 36 can flush header memory 20 by resetting stack pointer 40 to a value of binary "000" and writing over the first five bytes of header memory buffer 38 with each subsequent header 20'.

To discard the current received cell 18 (step 70), filter 36 increments cell pointer 42 that tracks the bytes of each current received cell 18 in the data stream 19. For example, as each of the fifty-three bytes of each received cell 18 arrives at receiving node 14, cell pointer 42 increments from a binary value of "000000" (zero) to a value of "110100" (fifty-two). First, as cell pointer 42 increments from a binary value of zero ("000000") to a binary value of four ("000100"), filter 36 stores the first five bytes of the current received cell 18, i.e., current header 20, in header memory buffer 38 (step 64). At that time, filter 36 determines whether current header 20 indicates that current received cell 18 is an idle cell 18*b* or an unassigned cell 18*c*before node 18 (step 66).

If current received cell 18 is either idle or unassigned (step 66), filter 36 rejects from storage the associated payloads 22*b*, 22*c* (step 70). Filter 36 increments a cell counter 42 from a binary value of "00101" (five) to a binary value of "110100" (fifty-two). When cell counter 42 reaches a value of fifty-two, the entire payload 20 has arrived at receiving node 14. Filter 36 resets cell counter 42 to a value of zero and begins storing the subsequent header 20' of subsequent received cell 18'. Thus, to discard idle and unassigned cells 18*b*, 18*c*, filter 36 tracks the associated payloads 22*b*, 22*c* as the payloads 22*b*, 22*c* arrive, but filter 36 does not store the payloads 22*b*, 22*c*.

If filter 36 determines current header 20 is non-idle and assigned (step 66), filter 36 proceeds to examine current header 20 in header memory buffer 38 to determine if current header 20 is an erroneous header 20*a* (steps 72 and 74). Filter 36 compares the checksum of HEC field 34, i.e, the fifth byte of current header 20, with the first four bytes of current header 20. If the checksum of HEC field 34 does not match the data in the first four bytes of current header 20 then current header 20 is an erroneous header 20*a*.

Filter 36 flushes erroneous headers 20*a* in the same manner as headers 20*b*, 20*c* associated with idle and unassigned cells 18*b*, 18*c* (step 68), and filter 36 discards payloads 22*a* associated with erroneous headers 20*a* in the same manner as payloads 22*b*, 22*c* associated with idle and unassigned cells 18*b*, 18*c* 9 (step 70). Also, as in the case of idle and unassigned cells 18*b*, 18*c*, filter 36 examines current header 20 and determines if current header 20 is an erroneous header before associated payload 22*a* arrives at receiving node 14. Thus, filter 36 does not store the payloads 22*a* of cells 18*a* having erroneous headers 20*a*.

In contrast, if current header 20 indicates that current received cell 18 is non-idle, is assigned, and does not have an erroneous header 20_a_ (steps 64, 66, 72, 74), filter 36 stores current received cell 18 (step 76), including header 20 and payload 22, in header memory buffer 38 and transfers cell 18 to cell memory buffer 44. Cell memory buffer 44 is a first-in-first-out (FIFO) stack which is nine bits by sixty-four bytes.

Each of the sixty-four memory locations 44_aa_–44_cl_ of cell memory buffer 44 is sized to 9 bits to contain a start of cell flag 54 (one bit) and one byte of each cell 18 (eight bits). Filter 36 sets the start of cell flag 54 to a logical "1" to indicate the starting location of current header 20 in the cell memory buffer 44. Otherwise, filter 36 sets each start of cell flag 54 to a logical "0".

Header memory buffer 44 contains sixty-four bytes to store one full cell, i.e., fifty-three bytes of data. Cell memory buffer 44 is sized to sixty-four bytes, rather than fifty-three bytes, to correspond to a binary stack pointer 46 of header memory buffer 38. Stack pointer 46 requires at least six bits to encompass all fifty-three bytes of received cell 18, but six bits allow stack pointer 46 to allocate sixty-four locations 44_aa_–44_cl_. Allocating sixty-four bytes of memory to cell memory buffer 44 provides a simpler implementation for cell memory buffer 44 because stack pointer 46 has a one-to-one correspondence with the addresses of cell memory buffer 44 and cannot erroneously point to an address outside cell memory buffer 44. In addition, when incremented, stack pointer 46 automatically resets from the sixty-fourth memory location ("111111") to the first cell memory location ("000000"). Alternatively, stack pointer 46 could be reset to "000000" after each cell 18 is received based on a signal received from filter 36.

If current cell 18 contains wanted data, receiving node 14 receives the remainder of current cell and stores the cell in header memory buffer 38. Subsequently, receiving node 14 transfers the entire current cell to cell memory buffer 44 prior to further processing.

To store current cell 18 in cell memory buffer 44, filter 36 increments a second cell pointer 43 that tracks the bytes of each received cell 18 in the data stream 19. Cell pointer 43 is incremented by the write enable control signal 74. Every write enable signal 74 indicates that data is to be transferred from buffer 38 to buffer 44, and, thus, cell pointer 43 should be incremented. For example, as header 20 of current cell 18 is received, filter 36 increments cell pointer 43 from a binary value of zero ("000000") to a binary value of four ("000100"). After filter 36 determines that current header 20 indicates received cell 18 contains wanted data, filter 36 increments cell pointer 43 to a binary value of "000101" (five), which corresponds to the first byte of associated payload 22. As each corresponding byte of payload 22 is transferred from header memory buffer 38 to cell memory buffer 44, filter 36 increments cell counter 43 from the binary value of "000101" (five) to a binary value of "110100" (fifty-two). When cell counter 43 reaches a binary value of "110100" (fifty-two), the entire payload 20 has been stored in cell memory 44. At that time, filter 36 resets cell counter 42 to a value of zero and begins to track the subsequent header 20' of subsequent received cell 18'.

Thus, filter 36 examines each data cell 18 as it arrives at receiving node 14 and determines whether the data cell is wanted or unwanted and respectively stores or discards the cell based on the determination. At that time, the subsequent data cell 18' becomes the current data cell 18 and the process is repeated.

Other embodiments are within the scope of the following claims.

For example, in the embodiment described above, unwanted data cells are filtered from a sequential data stream 19 according to the specifications of the ITU-T standards and recommendations for an ATM network. However, other embodiments may be compatible with other standards or other types of networks which require unwanted data to be filtered from the wanted data. All or part of filter 36 could be implemented in layers other than the physical layer of an ATM network 10. Also, the cell structure could be other than as described in association with ATM networks, for example, the payloads could have variable lengths or unwanted data cells could be indicated by different structures than those defined for an ATM network.

In addition, unwanted data cells may be cells other than cells included in the classes of idle cells, unassigned cells, or cells having erroneous headers. Unwanted data cells could include, e.g., only idle cells, and could include different classes, additional classes, fewer classes, or different combinations of classes. Additional embodiments could separate other classes of ATM receive cells, e.g., operation and maintenance (OAM) cells, into different memory locations or different memory buffers.

The filter 36 described above can be incorporated on an integrated circuit for use in an ADSL system having a 10–12 Megahertz (MHz) data reception clock and a 25 MHz or 35 MHz system clock, or other configurations and frequencies could be used.

What is claimed is:

1. A method for processing digital data received by a receiving node of a network from a transmitting node of the network, the method comprising:

storing in a memory of the receiving node a fractional portion of a received data cell containing digital data;

examining the stored fractional portion of the data cell to make a determination of whether the data cell is a wanted data cell, the determination being completed prior to storing an entire portion of the data cell;

selectively storing, based on the determination, the entire portion of the data cell in an additional memory of the receiving node, such entire portion being stored in the additional memory if the data cell is a wanted data cell, such entire portion being rejected from storage in the additional memory if the data cell is an unwanted data cell, wherein a remaining unstored portion of the data cell is stored in the memory of the receiving node if the data cell is a wanted data cell, the remaining unstored portion being rejected from storage in the memory of the receiving node if the data cell is an unwanted data cell.

2. The method of claim 1 further comprising selectively transferring the entire portion of the data cell from the memory to the additional memory, such entire portion being transferred if the data cell is a wanted data cell, such entire portion of the data cell being rejected from transfer if the data cell is an unwanted data cell.

3. The method of claim 1 wherein the fractional portion of the data cell is stored in the memory of the receiving node based on a first frequency, the entire portion of the data cell being stored in the additional memory of the receiving node based on a second frequency having a faster rate than the first frequency.

4. The method of claim 1 wherein examining the fractional portion of the data cell further comprises examining a header of the data cell.

5. The method of claim 4 wherein examining the header further comprises determining whether the data cell is an idle data cell, and wherein unwanted data cells comprise idle data cells.

6. The method of claim 4 wherein examining the header further comprises determining whether the data cell is an unassigned data cell, and wherein unwanted data cells comprise unassigned data cells.

7. The method of claim 4 wherein examining the header further comprises determining whether the header of the data cell is erroneous, wherein unwanted data cells comprise data cells having erroneous headers.

8. The method of claim 1 wherein selectively storing further comprises rejecting from storage a payload associated with the data cell if the data cell is an unwanted data cell.

9. The method of claim 6 wherein the data cell is an unwanted data cell if the data cell is idle, is unassigned, or has an erroneous header, and wherein the data cell is a wanted data cell if the data cell is not idle, is assigned, and has an error-free header.

10. The method of claim 1 wherein selectively storing further comprises setting a pointer to a location of a subsequent data cell of the sequentially received stream of data, the location indicating a beginning portion of the subsequent data cell.

11. A device connected at a receiving node of a digital data transmission network for filtering data cells containing unwanted digital data from a serial stream of data cells received from a transmitting node of the network, the stream of data cells potentially containing both wanted data and unwanted data, the device comprising:

a first memory having an input for electrically communicating with a data transmission line of the network, the first memory adapted to store at least a fractional portion of each received data cell;

a second memory electrically connected to the first memory for storing an entire portion of each received data cell having wanted data;

a filter being electrically connected to the first memory to receive at an input of the filter the fractional portion of each received data cell, the filter being electrically connected to a first write enable circuit of the first memory and a read enable circuit of the first memory and a second write enable circuit of the second memory;

wherein the filter is adapted to generate output signals disabling the first and second write enable circuits and the read enable circuit when the first memory contains the fractional portions of corresponding data cells containing unwanted data, the output signals capable of disabling the first and second memories from receiving remaining unstored portions of corresponding data cells containing unwanted data; and wherein the filter is adapted to generate output signals enabling the first and second write enable circuits and the read enable circuit when the first memory contains the fractional portions of corresponding data cells containing wanted data, the output signals capable of enabling the first and second memories to receive remaining unstored portions of corresponding data cells containing wanted data.

12. The device of claim 11 wherein the first write enable circuit of the first memory comprises an input electrically connected to a data reception clock for synchronizing data transmission between the transmitting node and the receiving node, the second write enable circuit of the second memory and the read enable circuit of the first memory each comprising an input electrically connected to a system clock capable of operating at a higher frequency than the data reception clock.

13. The device of claim 11 further comprising a serial-to-digital converter for converting serial data into a parallel data structure, the serial-to-digital converter having an input adapted for electrical communication with the data transmission line and having an output electrically connected to the input of the first memory.

14. A method for storing non-idle cells, assigned cells, and cells having corresponding non-erroneous cell headers, while rejecting from such storage idle cells, unassigned cells, and cells having corresponding erroneous headers, the cells sequentially received in a data reception system operating in an asynchronous transfer mode, each one of the received cells having an associated header followed by an associated payload, such header indicating whether the associated cell is unassigned, is idle, or has an erroneous header, the method comprising:

storing the header of each one of the sequentially received cells in a header memory;

examining each of the headers in the header memory to determine if each associated received cell is an idle cell;

examining each of the headers in the header memory to determine if each associated received cell is an unassigned cell;

rejecting from storage in a cell memory the payload associated with the received cell if the examined header associated with the received cell is determined to indicate the received cell is an idle cell;

rejecting from storage in the cell memory the payload associated with the received cell if the examined header associated with the received cell is determined to indicate the received cell is an unassigned cell;

examining each of the headers in the header memory to determine if each examined header is an erroneous header;

rejecting from storage in the cell memory the payload associated with the received cell if the examined header associated with the received cell is determined to indicate the examined header is an erroneous header; and storing in the cell memory the header and the payload of each associated received cell determined to be a non-idle cell, an assigned cell, and a cell having a non-erroneous header.

15. The method of claim 14 wherein storing in the cell memory the header and the payload of each associated received cell further comprises writing all bytes of the received cell to the cell memory.

16. The method of claim 14 wherein the payload of each received cell is rejected from storage in all memories if the first cell is unassigned, idle, or erroneous.

17. The method of claim 14 wherein storing the header of each one of the sequentially received cells further comprises storing the header in the header memory of the data reception system, each header being stored based on a data reception clock synchronizing a transmission of sequentially received cells between a data transmission system transmitting the sequentially received cells and the data reception system receiving the sequentially received cells.

18. The method of claim 17 wherein storing in the cell memory the header and the payload of each associated further comprises storing the header and the payload in the cell memory of the data reception system based on a system clock established by the data reception system independently of the data transmission system, the system clock having a higher frequency than the data reception clock.

19. The method of claim 18 further comprising synchronizing a write signal to the system clock, the write signal used to store received cells in the cell memory.

20. The method of claim 18 further comprising synchronizing a read signal to the system clock, the read signal used to read headers of the associated received cells from the header memory.

21. The method of claim 18 further comprising synchronizing a write signal to a data clock, the write signal being used to store headers of the associated received cells to the header memory.

22. A method for storing non-idle cells, assigned cells, and cells having corresponding non-erroneous cell headers, while rejecting from such storage payloads associated with idle, unassigned, and erroneous cells, the cells sequentially received in a data reception system operating in an asynchronous transfer mode, each one of the received cells having an associated header followed by an associated payload, such header indicating whether the associated cell is unassigned, is idle, or has an erroneous header, the method comprising:

storing the header of each one of the sequentially received cells in a memory of the data reception system, each header being stored based on a data reception clock causing a synchronized transfer of sequentially received cells between a data transmission system transmitting the sequentially received cells and the data reception system receiving the sequentially received cells;

examining each of the headers in the memory of the data reception system to determine if each associated received cell is an idle cell;

examining each of the headers in the memory of the data reception system to determine if each associated received cell is an unassigned cell;

examining each of the headers in the memory of the data reception system to determine if each examined header is an erroneous header; and storing in the memory of the data reception system the header and the payload of each associated received cell determined to be a non-idle cell, an assigned cell, and a cell having a non-erroneous header, the header and the payload of each associated cell being stored based on a system clock established by the data reception system independently of the data transmission system, the system clock having a higher frequency than the data reception clock.

23. The method of claim 22 further comprising rejecting from storage in the memory the received cell if the examined header associated with the received cell is determined to indicate the received cell is an idle cell.

24. The method of claim 22 further comprising rejecting from storage in the memory the received cell if the examined header associated with the received cell is determined to indicate the received cell is an unassigned cell.

25. The method of claim 22 further comprising rejecting from storage in the memory the received cell if the examined header associated with the received cell is determined to indicate the examined header is an erroneous header.

* * * * *